(12) United States Patent
Shao et al.

(10) Patent No.: US 11,890,812 B1
(45) Date of Patent: Feb. 6, 2024

(54) 3D PRINTING METHOD AND 3D PRINTING FORMED BODY

(71) Applicant: Amplifi Tech (Xiamen) Limited, Fujian (CN)

(72) Inventors: Zhi-Min Shao, Xiamen (CN); Sheng-Fa Chen, Nan'an (CN); Feng-Ming Chen, Xiamen (CN)

(73) Assignee: AMPLIFI TECH (XIAMEN) LIMITED, Fujian (CN)

( * ) Notice: Subject to any disclaimer, the term of this patent is extended or adjusted under 35 U.S.C. 154(b) by 0 days.

(21) Appl. No.: 18/072,910

(22) Filed: Dec. 1, 2022

(51) Int. Cl.
| | |
|---|---|
| *B29C 64/379* | (2017.01) |
| *B29C 64/264* | (2017.01) |
| *B29C 55/00* | (2006.01) |
| *B33Y 70/00* | (2020.01) |
| *B33Y 10/00* | (2015.01) |
| *B33Y 40/00* | (2020.01) |

(52) U.S. Cl.
CPC .......... *B29C 64/379* (2017.08); *B29C 55/005* (2013.01); *B29C 64/264* (2017.08); *B33Y 10/00* (2014.12); *B33Y 40/00* (2014.12); *B33Y 70/00* (2014.12)

(58) Field of Classification Search
CPC .................................................. B29C 64/379
See application file for complete search history.

(56) References Cited

U.S. PATENT DOCUMENTS

| | | | | |
|---|---|---|---|---|
| 10,500,786 B2 * | 12/2019 | Rolland | ................. | B29C 33/448 |
| 10,647,054 B2 * | 5/2020 | Gu | .......................... | B33Y 10/00 |
| 2013/0344601 A1 * | 12/2013 | Soman | ..................... | A61L 27/14 |
| | | | | 264/401 |
| 2016/0137839 A1 * | 5/2016 | Rolland | ................. | B33Y 50/02 |
| | | | | 522/71 |
| 2016/0339627 A1 * | 11/2016 | Tibbits | ................... | B29C 64/112 |
| 2017/0165908 A1 * | 6/2017 | Pattinson | ............... | B33Y 80/00 |
| 2018/0264718 A1 * | 9/2018 | Mccluskey | ............ | B33Y 80/00 |
| 2018/0370125 A1 * | 12/2018 | Rolland | ................ | B29C 64/129 |
| 2019/0039290 A1 * | 2/2019 | Lebrun | ................. | B29C 64/124 |
| 2019/0283315 A1 * | 9/2019 | Feller | ....................... | B22F 10/12 |
| 2020/0130266 A1 * | 4/2020 | DeSimone | ............ | B29C 64/379 |
| 2020/0180215 A1 * | 6/2020 | Truong | ................. | B29C 64/245 |

(Continued)

FOREIGN PATENT DOCUMENTS

| | | | |
|---|---|---|---|
| CN | 110023056 A | 7/2019 | |
| CN | 107787271 B | 12/2020 | |
| WO | WO-2019245892 A1 * | 12/2019 | ........... B29C 64/106 |

*Primary Examiner* — Timothy Kennedy
(74) *Attorney, Agent, or Firm* — Cooper Legal Group, LLC

(57) ABSTRACT

The present disclosure provides a 3D printing method including: a resin providing step of providing a dual cure resin; a light curing step of irradiating the dual cure resin by an ultraviolet light to perform 3D printing so as to form an intermediate body having a predetermined lattice shape; a stretching step of applying a stress on the intermediate body in a stretching direction according to a stretching ratio of a predetermined size to stretch and form a stretched body; and a thermal curing step of heating the stretched body to perform thermal curing and shaping so as to form a 3D printing formed body. When the light curing step is performed, a size in a non-stretching direction of the intermediate body is correspondingly pre-compensated based on the stretching ratio. The present disclosure further provides a 3D printing formed body.

19 Claims, 3 Drawing Sheets

(56) References Cited

U.S. PATENT DOCUMENTS

| | | | |
|---|---|---|---|
| 2020/0238604 A1* | 7/2020 | Hart | A61F 5/0111 |
| 2020/0307072 A1* | 10/2020 | Gacek | B29C 64/364 |
| 2021/0229364 A1* | 7/2021 | McLeod | B33Y 50/02 |
| 2021/0246298 A1* | 8/2021 | Grover | G03F 7/0037 |

* cited by examiner

3D PRINTING METHOD AND 3D PRINTING FORMED BODY

BACKGROUND OF THE DISCLOSURE

1. Field of the Disclosure

The present disclosure relates to a three-dimensional (3D) printing method and a 3D printing formed body.

2. Description of the Related Art 3D printing is any process capable of printing a 3D object. 3D printing primarily involves an incremental process in which a raw material is stacked under the control of a computer. Printing contents of 3D printing may come from a 3D model or other electronic data, and a printed 3D object can have any desired shape and geometric features.

Accompanied by the development of technology, many industries have started to apply 3D printing techniques, such as in the fields of construction, industrial design, automobiles, clothing, and foods, yielding many epoch-making products.

BRIEF SUMMARY OF THE DISCLOSURE

For conventional 3D printing techniques, a worktable having a large X-Y area is needed if a large 3D printing formed body is to be printed. However, due to extremely costly 3D printing equipment, the printable area in the X and Y directions is also restricted. In addition, the printing speed of 3D printing equipment is limited in the Z direction, in a way that the printing in the Z direction takes up an immense amount of time if a large 3D printing formed body is to be printed.

More specifically, China patent number CN 110023056 A discloses a method for manufacturing a 3D object, wherein a dual cure resin is light cured to form an intermediate body, the intermediate body is put to come into contact with an infiltrating liquid, and the intermediate body is thermally cured. However, in the method for manufacturing a 3D object disclosed by the China patent number CN 110023056 A, the intermediate body after light curing is formed into the shape of a final product, and the intermediate body is not stretched or set with a pre-compensation. Moreover, the U.S. patent publication number U.S. 20160339627 A discloses a method for manufacturing a 3D object, wherein a resin is light cured, an intermediate body is formed after the light curing, and the intermediate body is formed into a desired size by contraction of a base material. However, this patent publication does not disclose that a dual cure resin is used or that the intermediate body is stretched. Thus, in the prior art, a large 3D formed body can only be printed at great time costs and equipment costs, and therefore there is a need for improvement.

It is further discovered by the applicant that, by selecting a dual cure resin material and using the property of curing two times (light curing and thermal curing), with a stretching step performed after curing by a UV light, and printing and shaping followed by thermal curing and shaping, a 3D printing formed body having a large volume can be obtained, hence improving the issues of the prior art. More specifically, stretching in the Z direction is performed in order to save printing time, and stretching is also performed in the X direction or Y direction in order to overcome the size of a worktable of a 3D printer.

To solve the above issues, the present disclosure provides a 3D printing method including: a resin providing step of providing a dual cure resin; a light curing step of irradiating the dual cure resin by a UV light to perform 3D printing so as to form an intermediate body having a predetermined lattice shape; a stretching step of applying a stress on the intermediate body in a stretching direction according to a stretching ratio of a predetermined size to stretch and form a stretched body; and a thermal curing step of heating the stretched body to perform thermal curing and shaping so as to form a 3D printing formed body. When the light curing step is performed, a size in a non-stretching direction of the intermediate body is correspondingly pre-compensated based on the stretching ratio.

In one embodiment, the light curing step and the stretching step are performed simultaneously.

In one embodiment, the light curing step is performed in a curing unit of a cross section.

In one embodiment, in the stretching step, the stress is applied on the intermediate body by contact stretching.

In one embodiment, in the stretching step, the strength of the stress is 0.1 to 0.05 N.

In one embodiment, the stress is applied one end of the intermediate body along a lengthwise direction.

In one embodiment, the stress is applied two times or more.

In one embodiment, the stress is applied two times or more, and a position to which the stress is applied during the first time is different from a position to which the stress is applied during the second time.

In one embodiment, the stress is applied in a direction parallel to a direction of a cross section of the light curing.

In one embodiment, the stress is applied in a direction perpendicular to a direction of a cross section of the light curing.

In one embodiment, the method further includes, after the thermal curing step, a trimming step of removing a partial region of the stretched body, so as to form the 3D printing formed body.

To solve the above issues, a 3D printing formed body according to an embodiment of the present disclosure is made by the 3D printing method of the present disclosure.

An embodiment of the present disclosure is completed in view of the above issues of the prior art, and an object thereof is to provide a 3D printing method and a 3D printing formed body. The 3D printing method of the present disclosure solves the issues of 3D printing and forming efficiency and size caused by limitations of a machine. Moreover, the 3D printing formed body made by the 3D printing method of the present disclosure is not limited to a table size in X and Y directions of a 3D printing machine, and therefore provides enhanced printing efficiency and reduced production costs.

DETAILED DESCRIPTION OF THE DISCLOSURE

<Three-Dimensional (3D) Printing Method>

A 3D printing method according to an embodiment of the present disclosure is capable of manufacturing a large-size 3D printing formed body. Moreover, the 3D printing method of the present disclosure is capable of solving the issues of 3D printing and forming efficiency and size caused by limitations of a machine.

Figure 1:
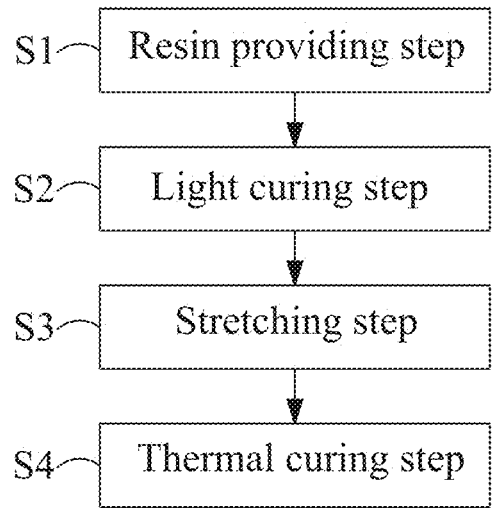
FIG. 1 is a flowchart of a 3D printing method according to an embodiment of the present disclosure.

As shown in FIG. 1, a 3D printing method according to an embodiment includes a resin providing step S1, a light curing step S2, a stretching step S3, and a thermal curing step S4, and may further include a trimming step S5 in response to requirements. The individual steps are described below.

(Resin Providing Step S1)

In the resin providing step S1, a dual cure resin is provided. The dual cure resin used in the present disclosure may be a light curing and thermal curing resin; more specifically, the dual cure resin can be formed and shaped by a dual curing process of ultraviolet (UV) light irradiation and heating. A specific example of a dual cure resin can be found in China patent number CN 110023056 A, of which the full text is incorporated herein by reference. In one embodiment, the dual cure resin may be selected from commercially available products and is not specifically defined herein. For example, dual cure resins such as EPU40, EPU41, and EPU44 provided by Carbon may be used, or other dual cure resins having mechanical properties similar to those of the above resins can be used; that is, the dual cure resin used is not specifically defined.

(Light curing step S2)

In the light curing step S2, the dual cure resin is irradiated and cured by a UV light to perform 3D printing, so as to form an intermediate body having a predetermined lattice shape. During 3D printing, the dual cure resin on the X-Y plane is first printed, and layers one after another in the X-Y plane are sequentially stacked in the Z axis. Thus, the light curing step is preferably performed in a curing unit of a cross section (e.g., along the Z axis, a first cross section is cured by light curing, then a second cross section is formed and cured, then a third cross section is formed and cured, etc.). Moreover, for example but not limitation, the wavelength of the UV light is 360 to 400 nm, and the irradiation time is 0.5 to 4 seconds.

(Stretching Step S3)

In the stretching step S3, a stress on the intermediate body in a stretching direction is applied according to a desired stretching ratio so as to stretch and form a stretched body. In one embodiment, the light curing step and the stretching step can be performed simultaneously.

Figure 3:
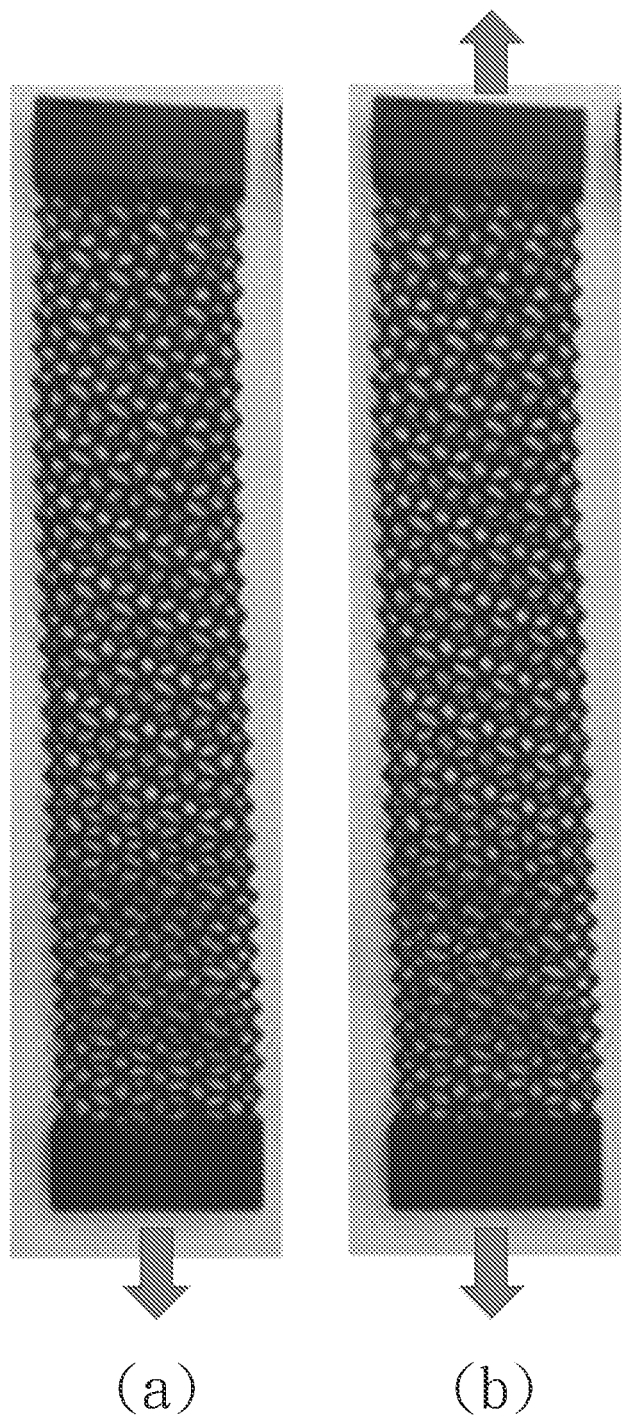
FIG. 3 is a schematic diagram of stretching an intermediate body.

Next, FIG. 3 shows an intermediate body having a predetermined lattice shape, and arrows in the drawing showing directions in which the stress is applied. In one embodiment, the stress may be applied in a contact manner to stretch the intermediate body. For contact stretching, a conventional stretching device can be used, for example but not limitation, a stretching device such as a metal rope having one clip on one end and an elastic loop on the other end. In general, the speed of stretching may be between 100 and 600 mm/min, so as to prevent poor stretching efficiency or damage of the intermediate body during the process of stretching. In an actual application, the stress is applied to a position that is one end of a lengthwise direction of the intermediate body. More specifically, stretching may be performed according to two approaches. In the first approach, as shown in FIG. 3(*a*), one end (without an arrow) of the intermediate body is fixed, and a stress is applied on the other corresponding end (with an arrow), so as to stretch the intermediate body toward a direction of the arrow. In the second approach, as shown in FIG. 3(*b*), a stress is applied to both ends of a direction (for example, the Y-axis direction) in which the intermediate body is to be stretched, so as to stretch the intermediate body.

More specifically, the stretching step may be performed as follows: assuming that stretching is to be performed in the Z direction, support structures with appropriate strengths are designed on the top and the bottom of the intermediate body in the Z direction. A clamp or a fixture is used for clamping/fixing on the support structures at the top and the bottom of the intermediate body, respectively, so as to apply the stress on one or both of the top and the bottom, respectively, such that the intermediate body deforms in the Z direction to thereby obtain a stretched body satisfying a standard size. Alternatively, when stretching is performed in the X direction or the Y direction, support structures with appropriate strengths are designed on the left and right or front and back (that is, both ends of the X direction or the Y direction) of the intermediate body. A clamp or a fixture is used for clamping/fixing on the support structures at left and right positions or front and back positions of the intermediate body, respectively, so as to apply the stress on one or both of the left and right or front and back sides, respectively, such that the intermediate body deforms in the X direction or the Y direction to thereby obtain a stretched body satisfying a standard size.

Figure 4:
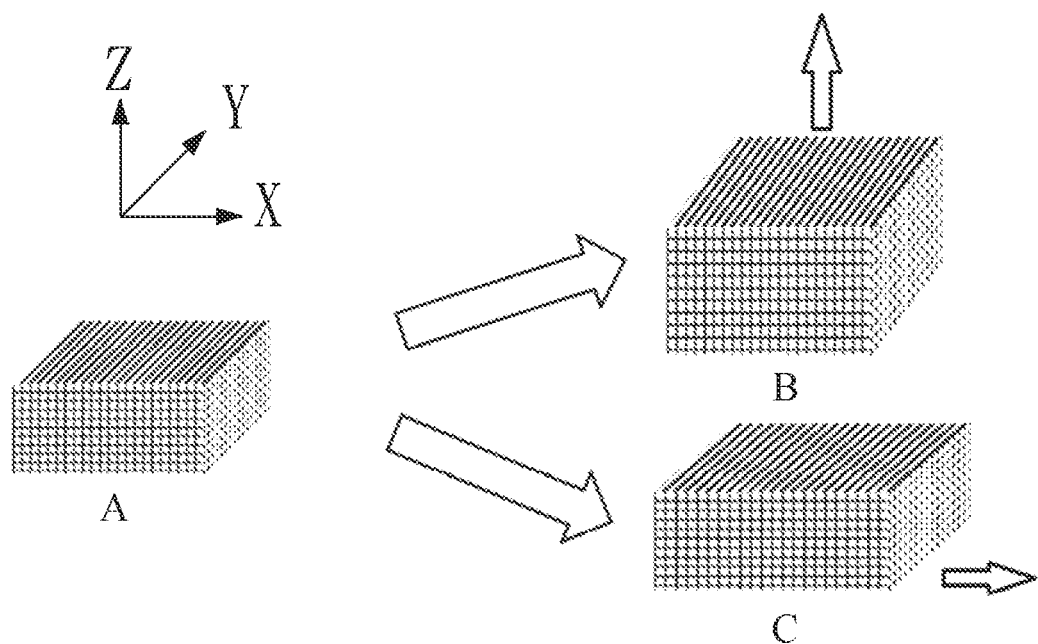
FIG. 4 is a schematic diagram of applying a stress on an intermediate body in different directions to form a stretched body.

In addition, FIG. 4 shows a change in the shape (size) of the intermediate body when a stress is applied in different directions to the intermediate body, wherein arrows in the drawing show directions in which the stress is applied. In an actual application, assume that the intermediate body not applied with a stress is A. When the stress is applied to the intermediate body, it is to be ensured that the lattice structure of the intermediate body is not damaged, and this is equivalent to stretching the intermediate body proportionally. Thus, when the stress is applied in a direction perpendicular to a direction of the cross section for light curing, that is, the Z direction, the lattice structure is scaled up proportionally without any damage, and a stretched body B shaped as a cuboid having a larger size in the Z direction than in the X direction and the Y direction is formed. Moreover, when the stress is applied in a direction parallel to a direction of the cross section for light curing, that is, the X direction, the lattice structure is scaled up proportionally without any damage, and a stretched body C shaped as a cuboid having a larger size in the X direction than in the Z direction is formed.

As described above, since the size changes after stretching, pre-compensation is necessary when the intermediate body is designed. For example, if the intermediate body is to be stretched in the X direction or the Y direction, because the size of the stretched body formed in the Z direction will be reduced, the size of the intermediate body in the Z direction needs to be pre-compensated so as to obtain the desired stretched body. More specifically, in order to obtain a stretched body and a 3D printing formed body having sizes satisfying standards, necessary compensation for a size parameter can be performed in advance for designs of an image file of an intermediate body, and the amount of the dual cure resin is adjusted in advance based on the compensation for the size parameter, so as to obtain a pre-compensated intermediate body. For example, when the intermediate body is stretched in the X direction, if it is learned according to previous stretching experience that the size of the stretched body in the Z direction is reduced by 50% compared to the size of the intermediate body in the Z direction, the size of the intermediate body in the Z direction needs to be pre-compensated by 100%; that is to say, the size of the pre-compensated intermediate body in the Z direction needs to be increased by 100% compared to the original size of the intermediate body in the Z direction. The pre-compensation size (increase ratio of original size)=[(1/(1−reduction ratio in size)%)−1]*%; that is, [(1/(1−50%))−1]*%=100%.

In an actual application, in order to maximize 3D printing efficiency, the stress is applied two times or more, and a position to which the stress is applied the first time and a position to which the stress is applied the second time (or more) may be different. More specifically, as shown in FIG. 3(b), for example but not limitation, stretching may be first performed on one end (the upper arrow) in the Y direction and then stretching is applied on the other end (the lower arrow) in the Y direction; and vice versa.

(Thermal Curing Step S4)

In the thermal curing step S4, the stretched body is heated to be thermally cured and shaped so as to form a 3D printing formed body. More specifically, because a dual cure resin is used in the present disclosure and a stretched body in a target size is obtained after stretching the intermediate body after the light curing and shaping, the stretched body needs to be heated and shaped into a 3D printing formed body. Herein, the dual cure resin does not expand or shrink during heating and shaping (that is, the size is fixed), and so the volume of the 3D printed formed body after the thermal curing step is equal to that of the stretched body. Moreover, the heating temperature may be, for example but not limitation, 110 to 120° C. for a heating time of 2 to 6 hours.

(Trimming Step S5)

Figure 2:
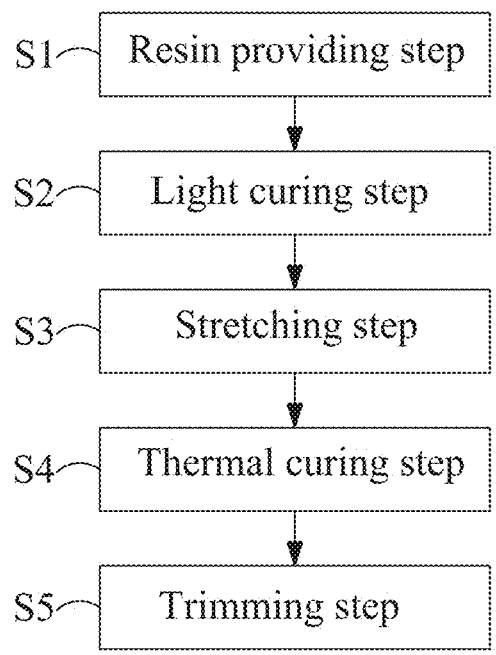
FIG. 2 is a flowchart of a 3D printing method according to another embodiment of the present disclosure.

As shown in FIG. 2, in response to requirements (i.e., as needed), the method further includes, after the thermal curing step S4, a trimming step S5 of removing a partial region of the stretched body after the thermal curing step, so as to form the 3D printing formed body. Since 3D printing is performed by stacking layers one after another, in order to provide a smooth printing process and a stable structure, in addition to a target structure, a partial region supporting the intermediate body may sometimes be added when a structure is designed. Once the intermediate body has been stretched and the stretched body has undergone the thermal curing step, preferably, the trimming step is performed to remove the additional support.

[EMBODIMENTS]

The present disclosure is further specifically described by way of the embodiments and comparison example below.

[Reference Example, Embodiments 1 to 3, and Comparison Example]

First of all, different stresses are applied, in the X direction, on the intermediate body having a predetermined lattice shape according to Table-1, and 3D printing formed bodies of embodiments 1 to 3 and the comparison example are manufactured according to above steps S1 to S4. Moreover, a 3D printing formed body not processed by the stretching step is used as a reference example.

TABLE 1

| | Experiment | | | |
|---|---|---|---|---|
| | Embodiment 1 | Embodiment 2 | Embodiment 3 | Comparison example |
| Original Length (X Direction) | 155 mm | | | |
| Length After Stretching (X Direction)/Stress | 160 mm/ 0.1N | 180 mm/ 0.2N | 188 mm/ 0.5N | 230 mm/ 1N |
| Stretching Ratio % (X Direction) | 3.2% | 16.1% | 21.3% | 48.3% |
| Original Height (Z Direction) | 4.65 mm | | | |
| Height After Stretching (Z Direction) | 4.5 mm | 3.8 mm | 3.2 mm | 2.5 mm |
| Reduction Ratio After Stretching (Z Direction) | −4.3% | −18.1% | −32.3% | −46.2% |
| Original Lattice Size | 3.7 mm | | | |
| Lattice Size After Stretching | 3.9 mm | 4.3 mm | 4.5 mm | 5.4 mm |
| Change In Lattice Size After Stretching (%) | 5.4% | 16.2% | 21.6% | 49.5% |

It is seen from Table-1, when stresses of 0.1 N, 0.2 N, 0.5 N, and 1 N are applied on the intermediate body in the X direction, it is observed that the length of the stretched body is stretched from 155 mm of the intermediate body to 160 mm, 180 mm, 188 mm, and 230 mm; that is, the stretch ratios of embodiments 1 to 3 and the comparison example are 3.2%, 16.1%, 21.3%, and 48.3%, respectively. Hence, the strength of stress and the stretch length/stretch ratio are positively correlated. Moreover, it is learned from Table-1, the lattice size also changes along with the stretching, and the change in the lattice size and the strength of stress are also positively correlated.

Figure 5:
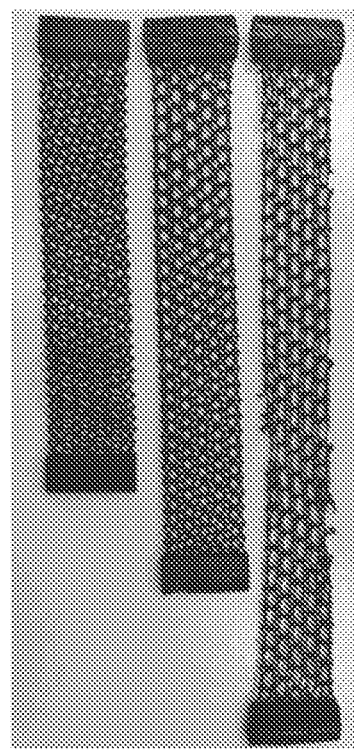
FIG. 5 shows photographs of 3D printing formed bodies of a reference example, embodiment 3, and a comparison example.

Next, as shown in FIG. 5, FIG. 5 shows, from left to right, 3D printing formed bodies of the reference example, embodiment 3, and the comparison example. It is seen from FIG. 5, the lattice structure of the 3D printing formed body contains breakage, that is, the change in the lattices after the stretching is too high (49.5%), and this is undesirable. In comparison, the 3D printing formed body of embodiment 3 is still kept with an intact lattice structure, with merely the lattice structure being scaled up proportionally. That is to say, the changes in the lattices of embodiments 1 to 3 are within a tolerable range, that is, the lattice structure is not damaged, and gaps of lattices can be proportionally stretched in the stretching direction.

Further, it is seen from Table-1, the stretching ratios (in the X direction) in embodiments 1 to 3 are 3.2% to 21.3%, and the reduction ratios in size in the Z direction are −4.3% to −32.3% (the negative value indicates reduction), meaning that pre-compensation is needed due to the size reduction in a non-stretching direction (the Z direction). Next, taking embodiment 3 for example, since the size in the Z direction is reduced by 32.3%, it can be calculated that the size of the intermediate body in the Z direction needs to be pre-compensated by 47.7% under the conditions of embodiment 3; that is, the size of the pre-compensated intermediate body in the Z direction needs to be increased by 47.7% compared to the original size of the intermediate body in the Z direction. The pre-compensation size (increase ratio of original size)=[(1/(1−32.3%))−1]*%=47.7%.

Moreover, it is known from Table-1, the stress for stretching of the present disclosure is preferably within the range of 0.1 N and 0.5 N. The stretching length/strength ratio may be too low if the stress for stretching is less than 0.1 N, and the effect of the present disclosure cannot be achieved; the lattice structure may be damaged if the stress for stretching is more than 0.5 N such that a good 3D printing formed body cannot be obtained. In addition, for example but not limitation, if a dual cure resin of different properties is used, the preferable range of the stress for stretching may also be different.

In conclusion, with the dual cure resin and the steps described above, the 3D printing method of the present disclosure solves the issues of 3D printing and forming efficiency and size caused by limitations of a machine.

A 3D printing formed body according to an embodiment of the present disclosure is made by the above 3D printing method of the present disclosure. The 3D printing formed body made by the method of the present disclosure is not limited to a table size in X and Y directions of a 3D printing machine, and therefore provides enhanced printing efficiency and reduced production costs.

It should be noted that the present disclosure is not limited to the various embodiments described above, and various modifications made be made within the scope of the appended claims. Moreover, implementation forms arrived by appropriately combining the technical means disclosed in the embodiments described above are also to be encompassed within the technical scope of t present disclosure.

What is claimed is:

1. A three-dimensional (3D) printing method, comprising:
   a resin providing step of providing dual cure resin;
   a light curing step of irradiating the dual cure resin by an ultraviolet (UV) light to perform 3D printing, so as to form an intermediate body having a predetermined lattice shape;
   a stretching step of applying a stress on the intermediate body in a stretching direction according to a stretching ratio of predetermined dimensions so as to stretch and form a stretched body; and
   a thermal curing step of heating the stretched body to perform thermal curing and shaping so as to form a 3D printing formed body,
   wherein, during the light curing step, a size of the intermediate body in a non-stretching direction is correspondingly pre-compensated based on the stretching ratio.

2. The 3D printing method according to claim 1, wherein the light curing step and the stretching step are performed simultaneously.

3. The 3D printing method according to claim 1, wherein the light curing step is performed in a curing unit of a cross section.

4. The 3D printing method according to claim 1, wherein in the stretching step, the stress is applied on the intermediate body by contact stretching.

5. The 3D printing method according to claim 1, wherein in the stretching step, a strength of the stress is 0.1 to 0.5 N.

6. The 3D printing method according to claim 5, wherein the stress is applied to one end of the intermediate body along a lengthwise direction.

7. The 3D printing method according to claim 6, wherein the stress is applied two times or more.

8. The 3D printing method according to claim 7, wherein the stress is applied two times, and a position to which the stress is applied during a first time is different from a position to which the stress is applied during a second time.

9. The 3D printing method according to claim 1, wherein the stress is applied in a direction parallel to a direction of a cross section of the light curing.

10. The 3D printing method according to claim 1, wherein the stress is applied in a direction perpendicular to a direction of a cross section of the light curing.

11. The 3D printing method according to claim 1, further comprising, after the thermal curing step, a trimming step of removing a partial region of the stretched body, so as to form the 3D printing formed body.

12. The 3D printing method according to claim 2, wherein the light curing step is performed in a curing unit of a cross section.

13. The 3D printing method according to claim 2, wherein in the stretching step, the stress is applied on the intermediate body by contact stretching.

14. The 3D printing method according to claim 2, wherein in the stretching step, a strength of the stress is 0.1 to 0.5 N.

15. The 3D printing method according to claim 14, wherein the stress is applied to one end of the intermediate body along a lengthwise direction.

16. The 3D printing method according to claim 15, wherein the stress is applied two times or more.

17. The 3D printing method according to claim 16, wherein the stress is applied two times, and a position to which the stress is applied during a first time is different from a position to which the stress is applied during a second time.

18. The 3D printing method according to claim 2, wherein the stress is applied in a direction parallel to a direction of a cross section of the light curing.

19. The 3D printing method according to claim 2, wherein the stress is applied in a direction perpendicular to a direction of a cross section of the light curing.

* * * * *